Patented Sept. 22, 1931

1,823,943

UNITED STATES PATENT OFFICE

GEORG KALISCHER, OF FRANKFORT-ON-THE-MAIN, AND CARL SCHULTIS, OF FRANK-FORT-ON-THE-MAIN-FECHENHEIM, GERMANY, ASSIGNORS TO GENERAL ANILINE WORKS INC., OF NEW YORK, N. Y., A CORPORATION OF DELAWARE

NEW AZODYESTUFFS AND PROCESS OF MAKING SAME

No Drawing. Application filed June 8, 1929, Serial No. 369,520, and in Germany June 16, 1928.

The present invention relates to new azodyestuffs and to a process of preparing the same. More particularly it relates to azodyestuffs corresponding to the general formula:

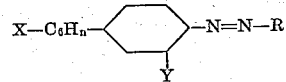

wherein X means hydrogen or an alkyl group, $n$ the number 8 or 10, Y hydrogen, halogen, an alkyl or an alkoxy group and R an aromatic residue capable of combining with diazo compounds and containing at least one sulfonic group.

We have found that diazobenzene compounds which contain in the para-position to the diazo group a hydrogenated nucleus of the benzene series and which may contain further substituents in an ortho-position, yield valuable new azodyestuffs when combined with the usual combining components containing at least one sulfonic group. The dyestuffs thus obtained correspond to the general formula:

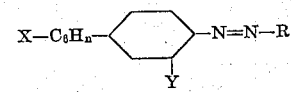

wherein X means hydrogen or an alkyl group, $n$ the number 8 or 10, Y hydrogen, halogen, an alkyl or an alkoxy group and R an aromatic residue capable of combining with diazo compounds and containing at least one sulfonic group.

These dyestuffs dye wool from an acid bath yellow to red to violet to brownish shades. They are distinguished by the purity and brightness of their shades and by a remarkably good fastness to washing and milling. The dyestuffs containing a cyclohexyl-ring in their molecule corresponding, for instance, to the general formula:

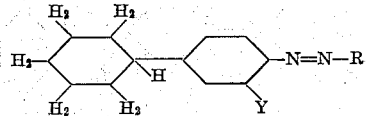

wherein Y and R have the aforesaid signification, dye generally more yellowish shades than those containing a cyclohexenyl nucleus, the other properties of both groups of dyestuffs being very similar.

In order to further illustrate our invention the following examples are given the parts being by weight and all temperatures in centigrade degrees. But we wish it to be understood that we are not limited to the particular conditions or specific products mentioned therein.

Example 1.

17.3 parts of 4-amino-2'.3'.4'.5'-tetrahydrodiphenyl are dissolved in about 80 parts of hot water by the addition of hydrochloric acid and the solution is introduced into a mixture of 23 parts of hydrochloric acid (specific gravity = 1.155) and ice. The suspension thus formed is diazotized at about 5-10° with a solution of 6.9 parts of sodium nitrite in about 50 parts of water. The diazo solution obtained thereby is combined at about 10° with a solution of 24.6 parts of the sodium salt of 2-hydroxynaphthalene-7-sulfonic acid and 30 parts of sodium carbonate.

The dyestuff thus produced corresponds probably to the formula:

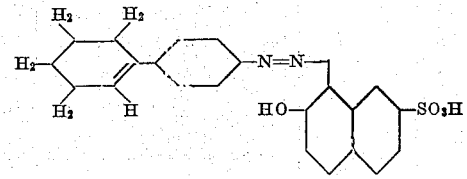

It dyes wool from an acid bath clear red shades.

Example 2

20.5 parts of 4-amino-3-methoxy-1'.2'.3'.4'.5'.6'-hexahydro-diphenyl are dissolved by boiling in 12 parts of hydrochloric acid (specific gravity=1.155) and 250 parts of water. The hot solution is poured onto ice. The pulp of crystals is mixed with 23 parts of hydrochloric acid (specific gravity=1.155) and diazotized at 10° with a solution of 6.9 parts of sodium nitrite in 50 parts of water, whereby the mixture is dissolved. The diazo solution thus obtained is combined at 10 to 15° with a solution of 24 parts of the sodium salt of 1-naphthol-4-sulfonic acid and 32 parts of sodium carbonate.

In this manner a dyestuff is produced which yields on wool fast bright red shades and corresponds probably to the formula:

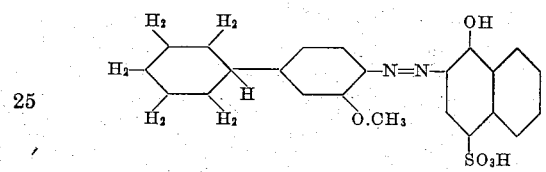

Example 3

A solution of 21 parts of the hydrochloric salt of 4-amino-hexahydro-diphenyl in about 100 parts of hot water is introduced into a mixture of 23 parts of hydrochloric acid (specific gravity=1.155) and ice. The suspension thus produced is diazotized at about 5–10° with a solution of 6.9 parts of sodium nitrite in about 50 parts of water. The solution of the diazo compound thus obtained is combined at abuot 10° with a solution of 27.6 parts of 1-(4' sulfophenyl)-3-methyl-5-pyrazolone and 34 parts of sodium carbonate.

The formed dyestuff corresponds probably to the formula:

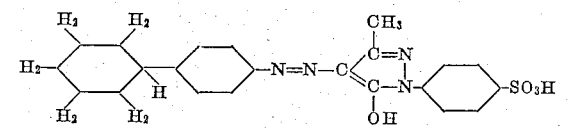

It dyes wool clear yellow shades.

Example 4

A hot solution of 18.9 parts of 4-amino-3-methyl-hexahydro-diphenyl in 35 parts of hydrochloric acid (specific gravity=1.155) and 300 parts of water is poured onto ice. The suspension of the hydrochloric salt of the base is diazotized at about 10° with a solution of 6.9 parts of sodium nitrite in 50 parts of water. The diazo solution is allowed to run at 10° into a solution of 44.5 parts of the sodium salt of 1-benzoylamino-8-naphthol-4.6-disulfonic acid and 43 parts of sodium carbonate in 500 parts of water. The dyestuff is isolated by the addition of 25 parts of common salt. It corresponds to the formula:

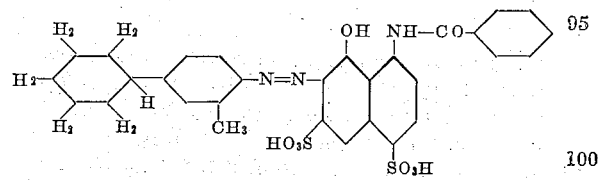

It dyes wool bright red shades of a good fastness to washing, milling and light.

In the following table there are cited some further components suitable for the combination according to our process and the properties of the dyestuffs obtained therefrom.

| 1 | 2 | 3 | 4 | 5 | 6 | 7 |
|---|---|---|---|---|---|---|
| Diazo compound of | Combined with | Color of the dry and pulverized dyestuff | Color of solution in water | Color of solution in dilute caustic alkali solution | Color of solution in sulfuric acid solution | Dyeing in wool |
| p-(cyclohexylaniline) | 1-naphthol-4-sulfonic acid | Yellowish red | Orange | Orange | Bluish red | Yellowish red |
| Do | 1-naphthol-7-sulfonic acid | Red | Orange | Orange | Yellowish red | Orange |
| Do | 2-naphthol-3.6-disulfonic acid | Dark red | Yellowish red | Yellowish red | Yellowish red | Yellowish red |
| Do | 1-naphthol-3.6-disulfonic acid | Reddish brown | Orange | Yellowish red | Yellowish red | Scarlet |
| Do | 2.8-dihydroxy-naphthalene-6-sulfonic acid | Dark brown | Red | Red | Violet | Red |
| Do | 2-amino-8-naphthol-6-sulfonic acid (acetic acid) | Reddish brown | Yellowish red | Yellowish red | Claret red | Reddish brown |
| Do | 1-toluene-sulfamino-8-naphthol-3.6-disulfonic acid | Yellowish red | Red | Red | Bluish red | Red |
| Do | 1-benzene-sulfamino-8-naphthol-4.6-disulfonic acid | Brownish red | Red | Yellowish red | Bluish red | Red |
| Do | 1(2'5'-dichloro-benzoylamino)-8-naphthol-4.6-disulfonic acid | Bluish red | Yellowish red | Orange | Claret red | Bright red |
| Do | 2-phenyl-amino-8-naphthol-6-sulfonic acid | Violet black | Reddish brown | Reddish brown | Bluish red | Brown |
| Do | 1-amino-2-(4'nitrophenyl)-azo-8-naphthol-3.6-disulfonic acid | Reddish brown | Blue | Reddish blue | Bluish green | Greenish blue |

| 1 Diazo compound of | 2 Combined with | 3 Color of the dry and pulverized dyestuff | 4 Color of solution in water | 5 Color of solution in dilute caustic alkali solution | 6 Color of solution in sulfuric acid solution | 7 Dyeing in wool |
|---|---|---|---|---|---|---|
| 4-amino-4'methyl-tetrahydrodiphenyl | 1-naphthol-7-sulfonic acid | Reddish brown | Yellowish red | Yellowish red | Violet | Yellowish red |
| 4-amino-tetrahydrodiphenyl | 2-naphthol-3.6-disulfonic acid | Reddish brown | Red | Yellowish red | Claret red | Bluish red |
| Do | 2.8-dihydroxy naphthalene-6-sulfonic acid | Reddish brown | Red | Red | Reddish blue | Bluish red |
| Do | 1-toluene sulfamino-8-naphthol-4.6-disulfonic acid | Violet black | Bluish red | Bluish red | Violet | Claret red |
| Do | 1-(2'5'-dichloro benzoylamino)-8-naphthol-4.6-disulfonic acid | Dark claret red | Bluish red | Yellowish red | Claret red | Bluish red |
| Do | 1-amino-2-(4'-nitrophenyl)-azo-8-naphthol-3.6-disulfonic acid | Black | Greenish blue | Greenish blue | Brown | Greenish blue |
| 4-amino-3-methyl-hexahydrodiphenyl | 1-naphthol-4-sulfonic acid | Yellowish red | Yellowish red | Orange | Bluish red | Yellowish red |
| Do | 2-naphthol-3.6-disulfonic acid | Red | Red | Yellowish red | Red | Yellowish red |
| Do | 1.8-dihydroxy naphthalene-4-sulfonic acid | Black | Yellowish red | Yellowish red | Violet | Reddish violet |
| Do | 2-amino-8-naphthol-6-sulfonic acid (in sodium carbonate solution) | Violet black | Red | Red | Claret red | Red |
| Do | 1-amino-8-naphthol-2.4-disulfonic acid | Dark brown | Bluish red | Red | Bluish red | Reddish violet |
| Do | 1-(2'-chlor-5' sulfophenyl)-3-methyl-5-pyrazolone | Yellow | Yellow | Yellow | Yellow | Greenish yellow |
| Do | 1-toluene sulfamino-8-naphthol-3.6-disulfonic acid | Reddish brown | Bluish red | Bluish red | Bluish red | Bluish red |
| Do | 1-benzoylamino-8-naphthol-3.6-disulfonic acid | Dark claret red | Bluish red | Bluish red | Blue | Red |
| Do | 1-toluene sulfo-ethyl amino-8-naphthol-3.6-disulfonic acid | Red | Red | Red | Claret red | Bluish red |
| Do | 1-(2'5'dichloro benzoyl-amino)-8-naphthol-4.6-disulfonic acid | Bluish red | Red | Yellowish red | Violet | Bluish red |
| Do | 2-phenyl-amino-8-naphthol-6-sulfonic acid | Dark brown | Brownish red | Brownish red | Claret red | Brown |
| Do | 2-(4'tolyl-amino)-8-naphthol-6-sulfonic acid | Dark brown | Brownish red | Brownish red | Bluish red | Brown |
| 4-amino-3-methyl-tetrahydrodiphenyl | 2-naphthol-7-sulfonic acid | Reddish brown | Red | Red | Violet | Red |
| Do | 1-naphthol-3.6-disulfonic acid | Dark reddish brown | Bluish red | Yellowish red | Claret red | Bluish red |
| Do | 2.8-dihydroxy-naphthalene-6-sulfonic acid | Brown | Red | Red | Blue | Claret red |
| Do | 2-amino-8-naphthol-6-sulfonic acid (acetic acid) | Blackish brown | Yellowish red | Yellowish red | Dull claret red | Red |
| Do | 1-toluene sulfamino-8-naphthol-4.6-disulfonic acid | Violet black | Bluish red | Bluish red | Violet | Reddish violet |
| Do | 1-(2'5'-dichloro benzoyl amino)-8-naphthol-4.6-disulfonic acid | Black | Claret red | Claret red | Blue | Violet |
| Do | 1-(2'-chloro-5'-sulfo phenyl)-3-methyl-5-pyrazolone | Orange | Reddish yellow | Yellow | Orange | Reddish yellow |
| 4-amino-3-methoxy-hexahydrodiphenyl | 1-naphthol-4-sulfonic acid | Yellowish red | Bluish red | Yellowish red | Bluish red | Bright red |
| Do | 2-naphthol-3.6-disulfonic acid | Reddish brown | Bluish red | Yellowish red | Bluish red | Bluish red |
| Do | 1-amino-8-naphthol-3.6-disulfonic acid | Dark brown | Bluish red | Red | Bluish red | Reddish violet |
| Do | 2-amino-8-naphthol-6-sulfonic acid | Dark brown | Red | Yellowish red | Claret red | Brownish red |
| Do | 2.8-dihydroxy-naphthalene-6-sulfonic acid | Brownish black | Bluish red | Red | Blue | Bluish red |
| Do | 1-chloro-8-naphthol-3.6-disulfonic acid | Bluish red | Bluish red | Yellowish red | Violet | Bluish red |
| Do | 1-toluene sulfamino-8-naphthol-3.6-disulfonic acid | Claret red | Bluish red | Red | Violet | Reddish violet |
| Do | 1-benzoyl-amino-8-naphthol-3.6-disulfonic acid | Bluish red | Bluish red | Yellowish red | Claret red | Bluish red |
| Do | 1-(2'5'-dichloro benzoyl amino)-8-naphthol-4.6-disulfonic acid | Reddish brown | Bluish red | Yellowish red | Claret red | Reddish violet |
| Do | 1-benzene sulfamino-8-naphthol-4.6-disulfonic acid | Reddish brown | Red | Red | Violet | Reddish violet |
| 4-amino-3-methoxy-tetrahydrodiphenyl | 1-naphthol-7-sulfonic acid | Brown | Bluish red | Yellowish red | Violet | Bluish red |
| Do | 2-naphthol-3.6-disulfonic acid | Dull violet | Bluish red | Yellowish red | Violet | Claret red |
| Do | 2.8-dihydroxy naphthalene-6-sulfonic acid | Black | Claret | Red | Blue | Violet |
| Do | 1-amino-8-naphthol-3.6-disulfonic acid | Brownish black | Reddish violet | Claret red | Reddish blue | Violet |
| Do | 2-phenyl-amino-8-naphthol-6-sulfonic acid | Black | Claret red | Red | Blue | Reddish brown |
| Do | 1-(4'-sulfophenyl)-3-methyl-5-pyrazolone | Yellowish red | Orange | Yellow | Yellowish red | Reddish yellow |
| Do | 1-toluene sulfamino-8-naphthol-3.6-disulfonic acid | Violet | Violet | Claret red | Blue | Bluish violet |
| Do | 1-(2'5'dichloro benzoyl-amino)-8-naphthol-4.6-disulfonic acid | Dark violet | Claret red | Yellowish red | Blue | Violet |
| 4-amino-3-chloro-tetrahydrodiphenyl | 1-naphthol-4-sulfonic acid | Black | Bluish red | Claret red | Blackish blue | Red |
| Do | 1.8-dihydroxy naphthalene-4-sulfonic acid | Blackish violet | Red | Bluish red | Violet | Violet |
| Do | 2-amino-8-naphthol-6-sulfonic acid | Reddish brown | Red | Yellowish red | Claret red | Reddish brown |

We claim:

1. A process which comprises diazotizing an aromatic amine of the general formula:

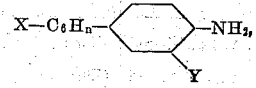

wherein X means hydrogen or an alkyl group, $n$ the number 8 or 10 and Y hydrogen, halogen, an alkyl or an alkoxy group, and combining the diazo compound thus obtained with a combining component of the naphthalene and pyrazolone series containing at least one sulfonic group.

2. A process which comprises diazotizing a 4-cyclo-hexyl-1-amino-benzene compound of the general formula:

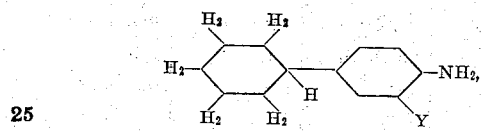

wherein Y means hydrogen, halogen, an alkyl or an alkoxy group, and combining the diazo compound thus obtained with a combining component of the naphthalene and pyrazolone series containing at least one sulfonic group.

3. A process which comprises diazotizing a 4-cyclo-hexyl-1-amino-benzene compound of the general formula:

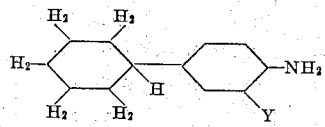

wherein Y means hydrogen, halogen, an alkyl or an alkoxy group, and combining the diazo compound thus obtained with a naphthol sulfonic acid of the general formula:

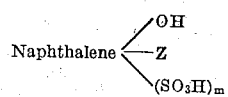

wherein Z means hydrogen, a hydroxy, amino, arylmino or acyl-amino-group and $m$ means the number 1 or 2.

4. A process which comprises diazotizing 4-cyclo-hexyl-2-methyl-1-amino-benzene of the formula:

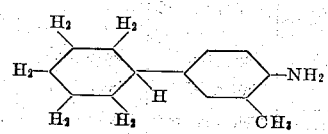

and combining the diazo compound thus obtained with 1-benzoyl-amino-8-naphthol-4.6-disulfonic acid of the formula:

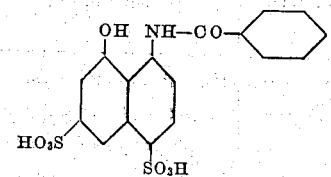

5. As new compounds the azo dyestuffs of the general formula:

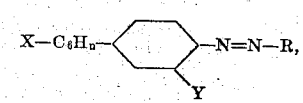

wherein X means hydrogen or an alkyl group, $n$ the number 8 or 10, Y hydrogen, halogen, an alkyl or an alkoxy group and R a residue of the naphthalene and pyrazolone series capable of combining with diazo compounds and containing at least one sulfonic group, which compounds are when dry colored powders, soluble in water, dyeing wool from an acid bath yellow, red to violet and brown shades of an excellent fastness to washing and milling.

6. As new compounds the azo dyestuffs of the general formula:

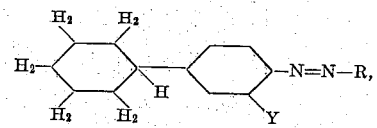

wherein Y means hydrogen, halogen, and alkyl or an alkoxy group and R a residue of the naphthalene and pyrazolone series capable of combining with diazo compounds and containing at least one sulfonic group, which compounds are when dry colored powders, soluble in water, dyeing wool from an acid bath yellow, red to violet and brown shades of an excellent fastness to washing and milling.

7. As new compounds the azo dyestuffs of the general formula:

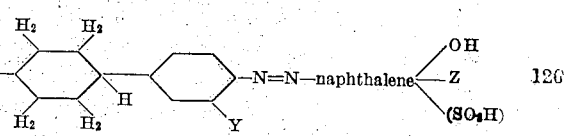

wherein Y means hydrogen, halogen, an alkyl or an alkoxy group, Z hydrogen, a hydroxy amino, arylamino or acylamino group and $m$ the number 1 or 2, which compounds are when dry colored powders, soluble in water, dyeing wool from an acid bath orange, red to violet and brown shades of an excellent fastness to washing and milling.
8. As a new compound the azo dyestuff of the formula:
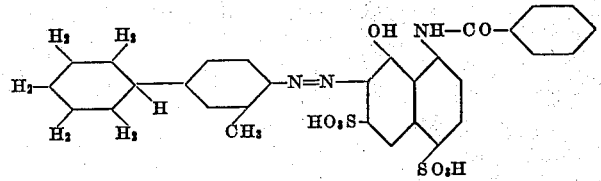
which compound is when dry a red powder, soluble in water to a red solution, dyeing wool from an acid bath bright red shades of a good fastness to washing, milling and light.
In testimony whereof, we affix our signatures.
GEORG KALISCHER.
CARL SCHULTIS.

Certificate of Correction

Patent No. 1,823,943. Granted September 22, 1931, to

GEORG KALISCHER ET AL.

It is hereby certified that error appears in the printed specification of the above-numbered patent requiring correction as follows: Page 4, claim 7, for the last equation of the formula "$(SO_3H)$" read $(SO_3H_m)$; and that the said Letters Patent should be read with this correction therein that the same may conform to the record of the case in the Patent Office.

Signed and sealed this 15th day of December, A. D. 1931.

[SEAL.]

M. J. MOORE,
*Acting Commissioner of Patents.*

Certificate of Correction

Patent No. 1,823,943. Granted September 22, 1931, to

GEORG KALISCHER ET AL.

It is hereby certified that Certificate of Correction issued December 15, 1931, was erroneously drawn as to the last equation of the formula on page 4, claim 7, and that this last equation of the formula should read $(SO_3H)_m$; and that the said certificate should be read with this correction therein that the same may conform to the record of the case in the Patent Office.

Signed and sealed this 26th day of January, A. D. 1932.

[SEAL.] M. J. MOORE,
*Acting Commissioner of Patents.*